United States Patent Office 3,117,989
Patented Jan. 14, 1964

3,117,989
HALOGENATED 2-KETO-[2.2.2]-BICYCLOOCTENE-7-KETONES, ACIDS, AND ESTERS
Homer J. Sims, Philadelphia, Pa., assignor to Rohm & Haas Company, Philadelphia, Pa., a corporation of Delaware
No Drawing. Filed Oct. 24, 1961, Ser. No. 147,197
7 Claims. (Cl. 260—468)

This invention deals with specific bicyclooctenes as new compositions of matter. It further deals with a method for the preparation of these specific bicyclooctenes.

The compounds of the present invention may be represented by the formula

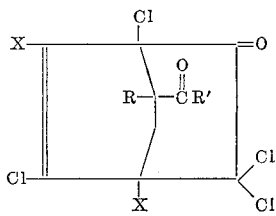

in which R represents a hydrogen atom or a methyl group, R' represents a hydroxy, methoxy, ethoxy, or methyl group, and X represents a chlorine or a hydrogen atom. These compounds are prepared by reacting a chlorinated phenyl hypochlorite with a suitable α,β-unsaturated carbonyl compound, such as methyl acrylate, methyl methacrylate, acrylic acid, methacrylic acid, or methyl vinyl ketone. If methyl methacrylate or methacrylic acid is used, then R in the above formula represents a methyl group. If methyl acrylate, acrylic acid, or methyl vinyl ketone is employed, then the symbol R stands for a hydrogen atom. Also, if methyl or ethyl acrylate or methacrylate is employed, the symbol R' stands for a methoxy or ethoxy group, and if the corresponding acid is employed, the symbol R' represents a hydroxyl group. When methyl vinyl ketone is one of the reactants, R' stands for the methyl group.

It is possible for the products to contain from 4 to 6 chlorine atoms, the same number as in the chlorinated phenyl-hypochlorite reactants. The distribution of the minimum number of chlorine atoms on the ring of the phenylhypochlorite should be the symmetrical arrangement (2,4,6). Positions 3 and 5 on the benzene ring may or may not be substituted with halogen. In all cases, the position, as well as the number, of the chlorine atoms on the bicyclooctene skeleton reflects the specific configuration of the chlorinated phenylhypochlorite reactant.

A prefererd group of products may be represented by the formula

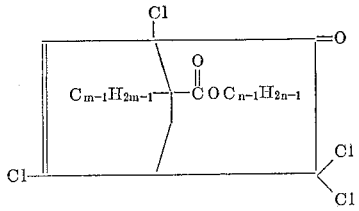

in which m is an integer of 1 to 2 and n is an integer of 1 to 3.

The chlorinated phenylhypochlorite reactant may be used as such or it may be prepared in situ in the reaction medium. If the latter embodiment is preferred, one mixes approximately equimolecular amounts of a chlorinated phenol and an alkyl hypochlorite in the reaction medium. The alkyl group in the hypochlorite may contain from 1 to 18 carbon atoms, preferably 4 to 8 carbon atoms. While the various isomeric arrangements within the alkyl definition are possible, the tertiary configuration is preferred. Typical embodiments include t-butyl hypochlorite, hexyl hypochlorite, t-octyl hypochlorite, and dodecyl hypochlorite.

It is frequently preferable to prepare the chlorinated phenyl hypochlorite in situ in the reaction medium as a matter of convenience and, also, because some of the contemplated hypochlorites tend to be somewhat unstable.

The present process involves a substantially equimolecular reaction between the aforementioned reactants. It is, however, frequently desirable to employ the acrylic, methacrylic, or vinyl reactant in excess. This assures high yields of desired product and also obviates the necessity of having a solvent. However, if a solvent is desired, there may be employed ethyl ether, t-butanol carbon tetrachloride, benzene, and the like. The solvent, of course, should be organic, volatile and inert. The present reaction is frequently mildly exothermic in nature, but in some cases heat must be supplied in order to obtain good yields of the desired product. The reaction is frequently conducted in a temperature range of about 20° to 120° C., preferably 25° to 85° C. It can be seen by this that the temperature range is not particularly critical. The products obtained are usually crystalline solids which are isolated by merely cooling the reaction mixture, or by evaporating the solvent or excess reactant as the case may be. The product may be recrystallized from ethanol, aqueous ethanol, or other suitable solvent.

The products of this invention are valuable fungicides, particularly when applied against Stemphylium sarcinaeforme and Monilinia fructicola in usual amounts and evaluated according to standard techniques. Concentrations of from .01 to 0.1% by weight in a commerical carrier are quite effective in this respect. Outstanding as fungicides are 1,3,3,5-tetrachloro-2-keto-7-carboxy-2, 2,2-bicyclooctene-5 and 1,3,3,5-tetrachloro-2-keto-7-carboxy-7-methyl-[2.2.2]-bicyclooctene-5, which give 100% 7-control with both of the aforementioned fungi in concentrations of about 0.1% by weight. The compound, 1,3,3,5-tetrachloro-2-keto-7-carboxy-2,2,2 - bicyclooctene-5, completely controls Monilinia fructicola in concentrations as low as 0.01% by weight.

These compounds may be incorporated in usual amounts into organic coatings, films, or plastics to impart flame resistance.

The compounds of this invention, as well as the method of preparation, may be more fully understood by the following examples, which are offered by way of illustration and not by way of limitation. Parts by weight are used throughout.

*Example 1*

A solution of 2,4,6-trichlorophenol (19.7 parts, 0.1 mole) and methyl acrylate (8.6 parts, 0.1 mole) is prepared in 50 ml. ethyl ether. t-Butyl hpyochlorite (10.8 parts, 0.1 mole) is added during 1½ hours. The temperature remains at 28° to 32° C. without cooling. After the mixture stands overnight, the ether is removed under 30 mm. absolute pressure and the residue (30.5 parts) is allowed to stand overnight. The semi-solid mass is recrystallized from 150 ml. of ethanol to obtain 18 parts of white crystalline solid melting at 123° to 125° C. A sample is recrystallized a second time for analytical determinations (M.P. 124° to 126° C.). The product contains 37.86% carbon (37.77% theoretical), 2.69% hydrogen (2.53% theoretical), and 44.62% chlorine (44.60% theoretical). It has a molecular weight of 316±4 (318 theoretical) and is identified as 1,3,3,5-tetrachloro-2-keto-7-carbomethoxy-[2.2.2] - bicyclooctene - 5 having the formula

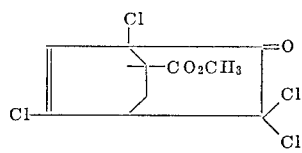

*Example 2*

A solution is prepared from methyl methacrylate and 2,4,6-trichlorophenol and treated with t-butyl hypochlorite as in Example 1. The product contains 39.64% carbon (39.79% theoretical), 3.26% hydrogen (3.04% theoretical), and 42.98% chlorine (42.74% theoretical), and is identified as 1,3,3,5-tetrachloro-2-keto-7-carbomethoxy-7-methyl-[2.2.2]-bicyclooctene-5 having the formula

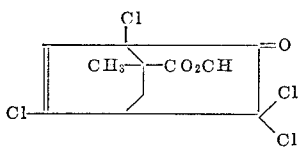

The same product is obtained by using octadecyl hypochlorite in place of t-butyl hypochlorite.

*Example 3* t-Butyl hypochlorite (21.7 parts, 0.2 mole) is added during 2 hours at 20° to 33° C. to a solution of acrylic acid (14.4 parts, 0.2 mole) and trichlorophenol (39.5 parts, 0.2 mole) in 100 ml. ethyl ether. After 12 hours the solvent is removed and the residue is dissolved in one liter of methanol. When one liter of water is added, there is obtained 31.8 parts of a yellow solid, M.P. 186° to 190° C. The crude product is recrystallized from 330 ml. of 50% aqueous ethanol using 5 parts of activated charcoal. After drying the product at 50° C. at 10 mm. absolute pressure for 3 hours, it melts at 189° to 191° C. and weighs 23 grams. The neutralization equivalent of the dried product is 318. Theory is 304. The product contains 35.47% carbon (35.56% theoretical), 2.05% hydrogen (2.13% theoretical), and 46.64% chlorine (46.66% theoretical) and is identified as 1,3,3,5-tetrachloro-2-keto-7-carboxy-[2.2.2] - bicyclooctene-5, having the formula

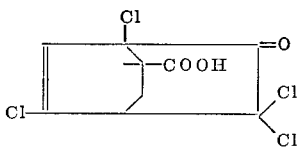

*Example 4*

There is prepared by the procedure outlined in Example 3, but using methacrylic acid in place of acrylic acid, the product identified as 1,3,3,5-tetrachloro-2-keto-7-carboxy-7-methyl-[2.2.2]-bicyclooctene-5 having the formula

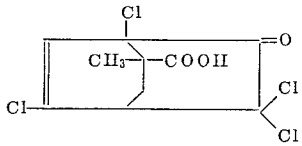

*Example 5* t-Butyl hypochlorite (10.8 parts, 0.1 mole) is added during 1.5 hours to a solution of trichlorophenol (19.7 parts, 0.1 mole) and methylvinylketone (7.0 parts, 0.1 mole) in 100 ml. of ethyl ether. After 48 hours the ether is partially evaporated and the mixture filtered. A white solid, weight 12 grams (60%), M.P. 138° to 140° C. is obtained. An additional 5 parts of brown semi-solid material is recovered from the filtrate. The product contains 39.88% carbon (39.88% theoretical), 2.65% hydrogen (2.67% theoretical), and 46.98% chlorine (46.97% theoretical) and is identified as 1,3,3,5-tetrachloro-2-keto-7-acetyl-[2.2.2]-bicyclooctene-5 having the formula

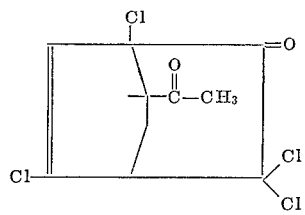

The same product is obtained by using octyl hypochlorite in place of t-butyl hypochlorite.

*Example 6*

Pentachlorophenyl hypochlorite (5 parts, previously prepared from pentachlorophenol and t-butyl hypochlorite) is dissolved in 15 ml. of methyl acrylate and refluxed for one hour. The excess acrylate is removed and the residue is recrystallized from absolute ethanol. The product contains 31.09% carbon (31.04% theoretical), 1.59% hydrogen (1.56% theoretical), and 55.3% chlorine (54.99% theoretical) and is identified as 1,3,3,4,5,6-hexachloro-2-keto-7-carbomethoxy-[2.2.2] - bicyclooctene-5, having the formula

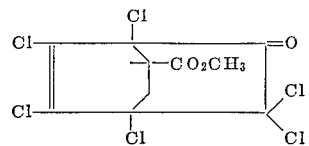

In a similar way, the ethyl ester counterpart is prepared by employing ethyl acrylate as the reactant in place of methyl acrylate.

This application is a continuation-in-part of application Serial No. 44,877, filed July 25, 1960, and now abandoned.

I claim:

1. A compound of the formula

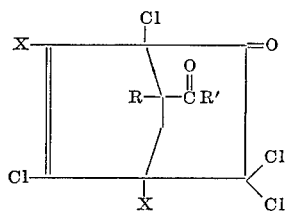

in which R is a member from the class consisting of hydrogen and methyl, R' is a member from the class consisting of hydroxy, methoxy, ethoxy, and methyl, and X is a member from the class consisting of chlorine and hydrogen.

2. The compound, 1,3,3,5-tetrachloro-2-keto-7 - carbomethoxy-[2.2.2]-bicyclooctene-5.

3. The compound, 1,3,3,5-tetrachloro-2-keto-7-carbomethoxy-7-methyl-[2.2.2]-bicyclooctene-5.

4. The compound, 1,3,3,5-tetrachloro-2 - keto - 7 - carboxy-[2.2.2]-bicyclooctene-5.

5. The compound, 1,3,3,5-tetrachloro-2 - keto - 7 - carboxy-7-methyl-[2.2.2]-bicyclooctene-5.

6. The compound, 1,3,3,5-tetrachloro-2-keto-7-acetyl-[2.2.2]-bicyclooctene-5.

7. The compound, 1,3,3,4,5,6-hexachloro-2-keto-7-carbomethoxy-[2.2.2]-bicyclooctene-5.

References Cited in the file of this patent

Adams et al.: Organic Reactions, volume IV (New York, 1958), pages 1–6.

Denivelle et al.: Compt. rend. 235, 1514–16 (1952); Compt. rend. 237, 340–2 (1953); Compt. rend. 238, 124–6 (1954).